United States Patent [19]

Morishita et al.

[11] Patent Number: 4,789,040
[45] Date of Patent: Dec. 6, 1988

[54] MOTOR-DRIVEN POWER STEERING SYSTEM FOR A VEHICLE

[75] Inventors: Mitsuharu Morishita; Shinichi Kohge, both of Himeji, Japan

[73] Assignee: Mitsubishi Denki Kabushiki Kaisha, Japan

[21] Appl. No.: 60,859

[22] Filed: Jun. 12, 1987

[30] Foreign Application Priority Data

Jun. 12, 1986 [JP] Japan .............................. 61-139025
Jun. 12, 1986 [JP] Japan .............................. 61-139026
Jul. 14, 1986 [JP] Japan .............................. 61-166198

[51] Int. Cl.⁴ .................................................. B62D 5/04
[52] U.S. Cl. ...................................... 180/142; 180/79.1;
318/334; 318/473; 361/24; 361/25
[58] Field of Search ................. 180/79.1, 147, 148,
180/141, 142; 318/334, 471, 473, 474; 361/23,
24, 25, 31

[56] References Cited

U.S. PATENT DOCUMENTS

| 4,035,692 | 7/1977 | Luy | 361/24 |
| 4,195,254 | 3/1980 | Gurwicz | 318/334 |
| 4,532,567 | 7/1985 | Kade | 180/79.1 |
| 4,567,413 | 1/1986 | Yabe | 180/79.1 |

FOREIGN PATENT DOCUMENTS

| 38228 | 4/1975 | Japan . | |
| 13504 | 1/1982 | Japan | 318/334 |
| 18453 | 1/1985 | Japan | 180/79.1 |
| 2130537 | 6/1984 | United Kingdom | 180/79.1 |
| 2145678 | 4/1985 | United Kingdom | 180/79.1 |

Primary Examiner—John J. Love
Assistant Examiner—Everett G. Diederiks, Jr.
Attorney, Agent, or Firm—Leydig, Voit & Mayer

[57] ABSTRACT

A motor-driven power steering system for a vehicle capable of preventing a motor-related element such as a motor itself, power elements for controlling power supply to the motor or the like from being damage due to an abnormal temperature rise or overheating thereof, thereby substantially avoiding or reducing resultant unsureness or instability in the operator's steering feeling upon change in steering mode as well as improving safety in steering operation. The motor is operatively connected with a steering rack and energizable by a power source for power assisting the steering motion caused by the operator through a steering wheel. A temperature sensor detects the temperature of the motor-related element. An electromagnetic switching clutch is interposed between the motor and the steering rack for selectively establishing and interrupting the transmission of power assisting force from the motor to the steering rack in accordance with the travelling speed of the vehicle. A control unit is provided for controlling the operation of the motor in such a manner such that when the detected temperature of the motor-related element is higher than a prescribed level, the current supplied to the motor through the motor-related element is gradually reduced to lower the temperature of the motor-related element.

10 Claims, 9 Drawing Sheets

MOTOR-DRIVEN POWER STEERING SYSTEM FOR A VEHICLE

FIELD OF THE INVENTION

The present invention relates to a motor-driven power steering system for a vehicle adapted to power assist the operator-induced steering operation by means of the rotating force of a motor.

DESCRIPTION OF THE PRIOR ART

In the past, a motor-driven power steering system for a vehicle has hitherto been known to include a motor operatively connected with a steering rack through a speed reduction gear and a power transmission mechanism such as a gear transmission, a belt transmission or the like for power assisting the steering force exerted on the steering wheel by the operator. The motor is appropriately controlled by a control unit in accordance with the vehicle speed, the steering torque resulting from the steering force exerted on the steering wheel by the operator and the like. The control unit may include a power element for controlling the current supplied from a power source to the motor.

This type of the motor-driven power steering system, however, has the following problems. Specifically, if the power steering system is continuously operated in an operating range requiring large power-assisting force, the motor itself or the power element would be damaged due to overheating or abnormal temperature rise thereof, thus disabling the power-assisting operation of the steering system. In this case, since the assisting power is suddenly interrupted, there arises unsure or instable steering feeling on the part of the operator.

SUMMARY OF THE INVENTION

In view of the above, the present invention has the objective of overcoming the above-mentioned problems of the prior art, and has for its main object the provision of a motor-driven power steering system for a vehicle capable of preventing the motor or the power element from being damaged due to an abnormal temperature rise or overheating thereof, thereby avoiding or reducing resultant unsureness or instability in the operator's steering feeling as well as improving safety in steering operation.

In order to achieve the above object, according to the present invention, there is provided a motor-driven power steering system for a vehicle having a steering wheel operatively connected to steer steerable road wheels in response to force exerted thereon by an operator, the motor-driven power steering system comprising:

a torque sensor for detecting operator-induced steering torque resulting from steering force exerted on the steering wheel by the operator to generate an output signal representative thereof;

a vehicle speed sensor for detecting the vehicle speed to generate an output signal representative thereof;

a motor operatively connected with the steerable road wheels and adapted to be energized by a power source to transmit a force to the steerable road wheels for power assisting steering motion caused by the operator through the steering wheel;

a temperature sensor for detecting the temperature of an element of the motor to generate an output signal representative thereof;

a clutch means interposed between the motor and the steerable road wheels for selectively establishing and interrupting the transmission of power assisting force from the motor to the steerable road wheels in accordance with the travelling speed of the vehicle; and a control unit including means connected to a power source for supplying current to the motor, the control unit being connected receive the output signals from the torque sensor, the vehicle speed sensor and the temperature sensor for controlling the running operation of the motor in such a manner that when the detected temperature of the motor-related element is higher than a prescribed level, the current supplied to the motor is gradually reduced to lower the temperature of the motor-related element to within an allowable range, thereby preventing damage to the motor due to overheating thereof.

In one embodiment, the control unit determines whether or not the detected temperature of the motor-related element is higher than a prescribed level, and controls the current supplied to the motor in such a manner that the current supplied to the motor is controlled on the basis of the detected steering torque and the detected vehicle speed if the detected temperature of the motor-related element is equal to or lower than the prescribed level, and that the current supplied to the motor is decreased to lower the temperature of the motor-related element if the temperature of the motor-related element is higher than the prescribed level.

In another embodiment, the control unit determines whether or not the detected temperature of the motor-related element is higher than the prescribed level, and controls the current supplied to the motor in such a manner that the motor current is controlled on the basis of the detected steering torque and the detected vehicle speed if the detected temperature of the motor-related element is equal to or lower than the prescribed level, and that the motor current is gradually decreased to a prescribed level in a predetermined period of time to lower the temperature of the motor-related element if the temperature of the motor-related element is higher than the prescribed level.

In a further embodiment, the control unit is adapted to determine that the temperature of the motor-related element is higher than the prescribed level if current in excess of a prescribed level is continuously supplied to the motor over a duration longer than a predetermined period of time.

The motor-related element comprises the motor or a power element means for controlling the current supplied from the power source to the motor.

In a preferred embodiment, the control unit is adapted to calculate the electric resistance of the power element means based on the voltage across the power element and the current passing therethrough and determine the temperature of the power element means from the electric resistance thus calculated.

To one embodiment, the control unit comprises:

a steering torque measuring means adapted to receive the output signal from the torque sensor and measure the steering torque induced by the operator;

a vehicle speed measuring means adapted to receive the output signal from the vehicle speed sensor and measure the travelling speed of the vehicle;

a temperature measuring means adapted to receive the output signal from the temperature sensor and measure the temperature of the motor;

a temperature judging means adapted to receive the output signal from the temperature measuring means and to determine whether or not the detected temperature of the motor is higher than a prescribed level;

a motor current determining means for determining an appropriate current supplied to the motor in such a manner that the motor current is determined on the basis of the measured steering torque and the measured vehicle speed if the temperature judging means determines that the detected temperature of the motor is equal to or lower than the prescribed level, and that the motor current is decreased to lower the temperature of the motor if the temperature judging means determines that the detected temperature of the motor is higher than the prescribed level;

a motor current controlling means for controlling the running operation of the motor in accordance with the output signal from the motor current determining means; and a clutch controlling means for controlling the operation of the clutch means in accordance with the output signal from the vehicle speed measuring means.

In another embodiment, the control unit comprises:

a steering torque measuring means adapted to receive the output signal from the torque sensor and measure the steering torque induced by the operator;

a vehicle speed measuring means adapted to receive the output signal from the vehicle speed sensor and measure the travelling speed of the vehicle;

a power element resistance calculating means for calculating the electric resistance of the power element based on the voltage across the power element means and the current passing therethrough, the power element resistance calculating means being further operable to determine the temperature of the power element means from the calculated electric resistance of the power element means;

a power element temperature judging means adapted to receive the output signal from the power element resistance calculating means and to determine whether or not the determined temperature of the power element means is higher than a prescribed level;

a motor current determining means for determining an appropriate level of current supplied to the motor in such a manner that the motor current is determined on the basis of the measured steering torque and the measured vehicle speed if the temperature judging means determines that the temperature of the power element means is at most equal to the prescribed level, and that the motor current is decreased to lower the temperatue of the power element means if the temperature judging means determines that the temperature of the power element is higher than the prescribed level;

a power element controlling means for controlling the running operation of the motor through the power element means in accordance with the output signal from the motor current determining means; and a clutch controlling means for controlling the operation of the clutch means in accordance with the output signals from the vehicle speed measuring means.

In a further embodiment, the control unit comprises:

a steering torque measuring means adapted to receive the output signal from the torque sensor and measure the steering torque induced by the operator;

a vehicle speed measuring means adapted to receive the output signal from the vehicle speed sensor and measure the travelling speed of the vehicle;

an over-current judging means acting as the temperature sensor and adapted to judge whether or not current in excess of a predetermined level is continuously supplied to the motor over a duration longer than a predetermined period of time;

a motor current determining means for determining an appropriate current supplied to the motor in such a manner that the motor current is determined on the basis of the measured steering torque and the measured vehicle speed unless the over-current judging means determines that current in excess of the predetermined level continuously passes through the motor-related element over a duration longer than the predetermined period of time and that the motor current is reduced to lower the temperature of the motor-related element if the over-current judging means determines that current in excess of the predetermined level continuously passes through the motor-related element over a duration longer than the predetermined period of time;

a motor current controlling means for controlling the running operation of the motor in accordance with the output signal from the motor current determining means; and a clutch controlling means for controlling the switching operation of the clutch means in accordance with the output signal from the vehicle speed measuring means.

The above and other objects, features and advantages of the present invention will become apparent from the following detailed description of a few presently preferred embodiments of the invention when read in conjunction with the accompanying drawings.

BRIEF DESCRIPTION OF THE DRAWINGS

FIGS. 1 through 7 relate to a first embodiment of a motor-driven power steering system in accordance with the present invention, in which:

FIGS. 8 and 9 relate to another embodiment of the present invention, in which:

FIGS. 10 through 13 relate to a further embodiment of the present invention, in which:

DESCRIPTION OF THE PREFERRED EMBODIMENT

The present invention will now be described in detail with reference to a few presently preferred embodiments thereof as illustrated in the accompanying drawings. In the following description and the accompanying drawings, the same or corresponding portions or elements of the embodiments will be identified by the same reference numerals and characters.

Figure 1:
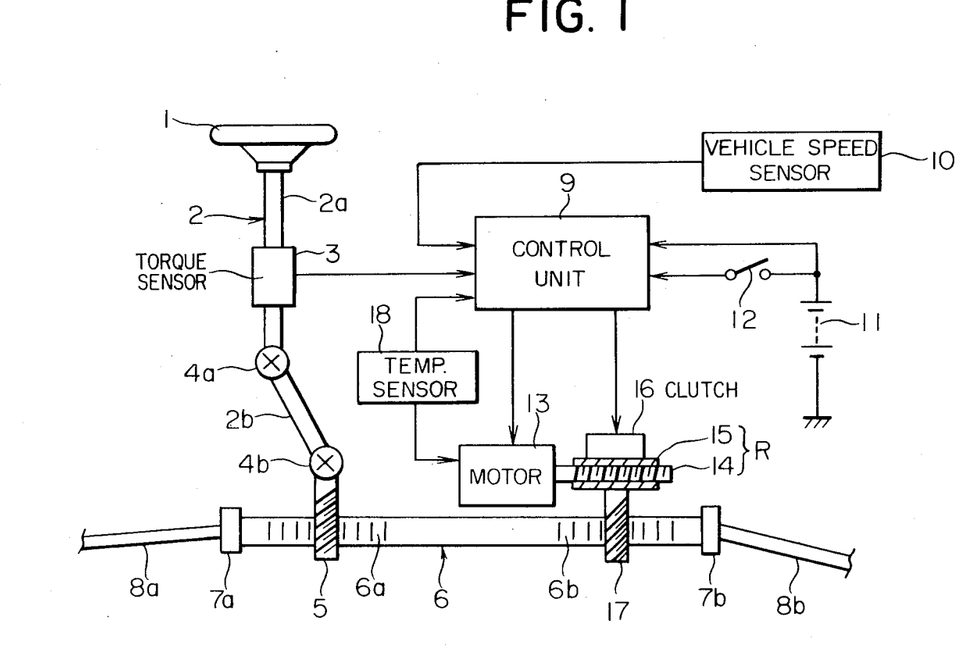
FIG. 1 is a schematic view showing the general arrangement of the motor-driven power steering system.

In FIG. 1, there is shown the general arrangement of a motor-driven power steering system constructed in accordance with the present invention. The motor-driven steering system as illustrated includes a steering wheel 1; a steering shaft 2 fixedly connected at its upper end with the steering wheel 1 for integral rotation therewith; a torque sensor 3 mounted on the steering shaft 2 for detecting operator-induced steering torque resulting from steering force exerted on to the steering wheel 1 by an operator to generate an electrical signal representative of the detected steering torque, the steering shaft 2 including an upper section 2a and a lower section 2b joined with each other through a first universal joint 4a; a first pinion 5 operatively connected at its upper end with the lower end of the steering shaft 2 through a second universal joint 4b; a rack 6 operatively connected at its opposite ends through ball joints 7a, 7b with tie rods 8a, 8b which are in turn connected with a pair of steerable road wheels (not shown), the rack 6 having a first tooth portion 6a in mesh with the first pinion 5 and a second tooth portion 6b axially spaced from or otherwise continuous with the first tooth portion 6a; a vehicle speed sensor 10 for detecting the travelling speed of the vehicle to generate an output signal representative of the detected vehicle speed; a power source 11 in the form of a battery adapted to be mounted on the vehicle; a key or ignition switch 12; a second pinion 17 in meshing engagement with the second rack tooth portion 6b on the rack 6; a motor 13 operatively connected through a speed-reduction gear R with the second pinion 17 for power assisting the steering motion of the rack 6 induced by the operator, the motor 13 being preferably in the form of a direct current motor having a shunt winding field or a magnetic field and adapted to be driven to rotate by the battery 11; a clutch means 16 in the form of an electromagnetic switching clutch interposed between the speed reduction gear R and the second pinion 17 for selectively establishing and interrupting the mechanical coupling between the speed reduction gear R and the second pinion 17 in accordance with the travelling speed of the vehicle; a temperature sensor 18 for detecting the temperature of a certain element related to the motor 13 to generate an output signal representative of the detected temperature; and a control unit 9 adapted to receive output signals from the torque sensor 3, the vehicle speed sensor 10 and the temperature sensor 18 for controlling the operations of the motor 13 and the clutch means 16 in such a manner that the current supplied to the motor 13 and the voltage imposed on the clutch means 16 are controlled in an appropriate manner in accordance with the detected steering torque, the detected vehicle speed and the detected temperature of the motor-related element so as to prevent trouble or breakdown of the motor 13 due to overheating thereof.

In the illustrated embodiment, the speed-reduction gear R comprises a worm 14 directly connected with an unillustrated rotary shaft of the motor 13, and a worm wheel 15 which is in mesh with the worm 14 and which is operatively connected with the clutch means 16. Also, the temperature sensor 18 in this embodiment acts to directly sense the temperature of the motor 13.

Figure 2:
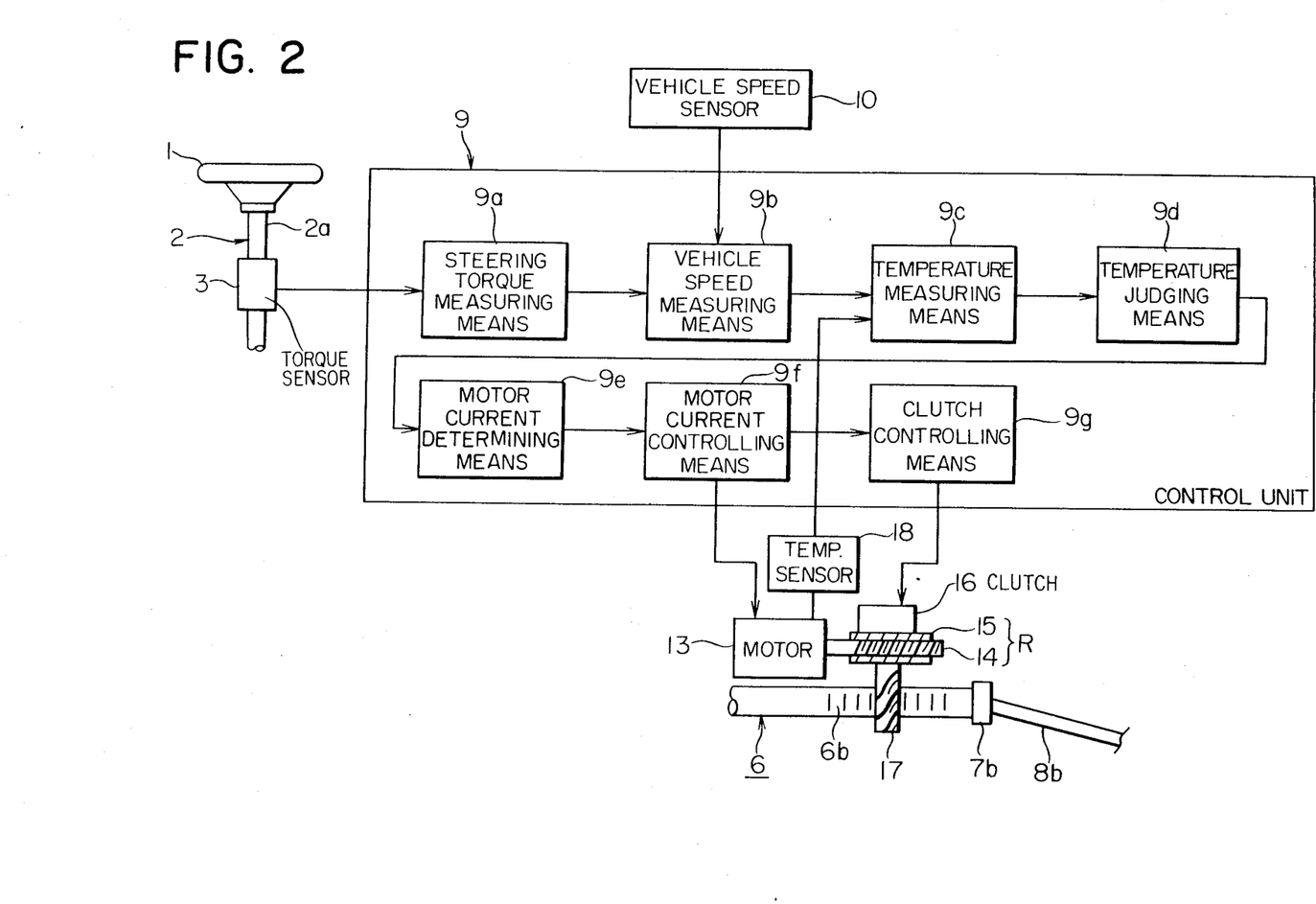
FIG. 2 is a block diagram showing a control unit and its related parts as illustrated in FIG. 1.

As illustrated in FIG. 2, the control unit 9 in accordance with this embodiment comprises: a steering torque measuring means 9a adapted to receive the output signal from the torque sensor 3 and measure the steering torque induced by the operator; a vehicle speed measuring means 9b adapted to receive the output signal from the vehicle speed sensor 10 and measure the travelling speed of the vehicle; a temperature measuring means 9c adapted to receive the output signal from the temperature sensor 18 and measure the temperature of the motor-related element or motor 13; a temperature judging means 9d adapted to receive the output signal from the temperature measuring means 9c and to determine whether or not the detected temperature of the motor 13 is higher than a prescribed level; a motor current determining means 9e for determining an appropriate current supplied to the motor 13 in such a manner that the motor current is determined on the basis of the measured steering torque and the measured vehicle speed if the temperature judging means 9d determines that the detected temperature of the motor 13 is equal to or lower than the prescribed level, and that the motor current is decreased to lower the temperature of the motor 13 if the temperature judging means 9d determines that the detected temperature of the motor 13 is higher than the prescribed level; a motor current controlling means 9f for controlling the running operation of the motor 13 in accordance with the current determined by the motor current determining means 9e; and a clutch controlling means 9g for controlling the switching operation of the clutch means 16 in accordance with the output signal from the vehicle speed measuring means 9b.

Figure 3:
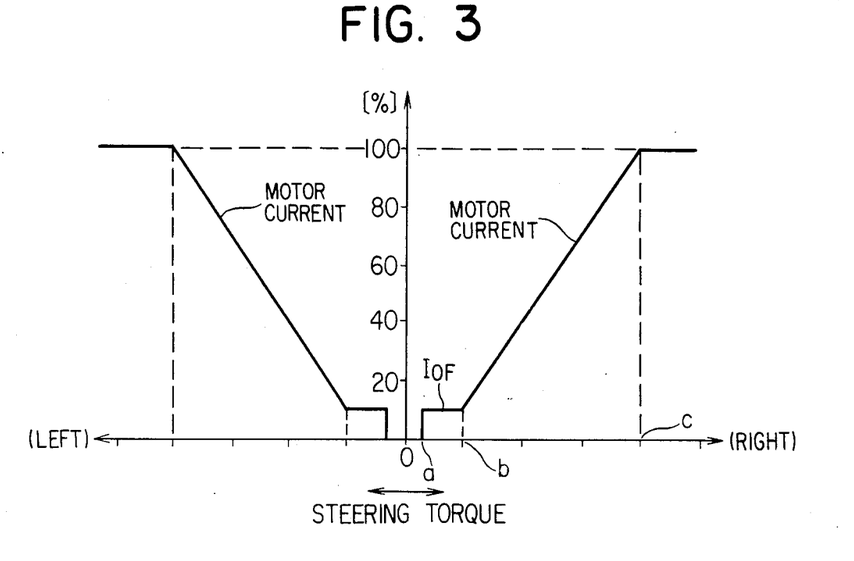
FIG. 3 is a characteristic view showing the relationship between the motor current and the steering torque.
Figure 4:
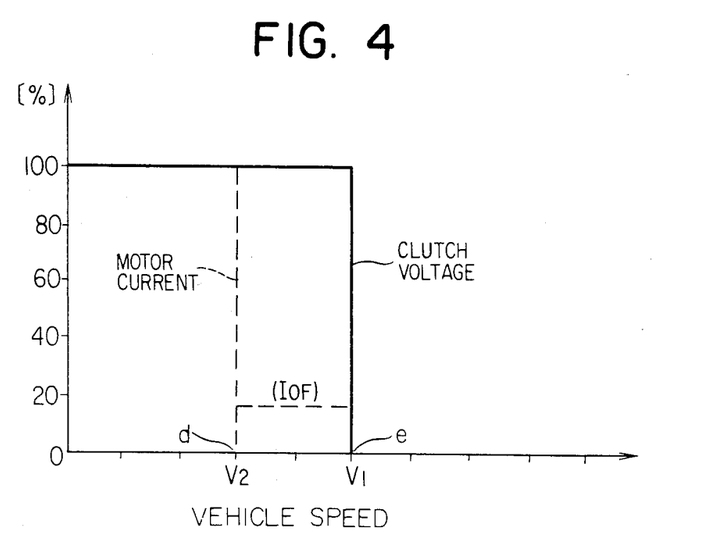
FIG. 4 is a characteristic view showing the relationship between the motor current and the vehicle speed as well as the relationship between the clutch voltage and the vehicle speed.

Now, the operation of the control unit 9 will be described in detail with reference to FIGS. 3 through 7. First, the case in which a vehicle is stationary or standing still will be considered. In this case, when a key or ignition switch (not shown) is first turned on to start the engine, the electromagnetic switching clutch 16 is automatically actuated to place the second pinion 17 into mechanical coupling with the worm wheel 15. In this state, when the steering wheel 1 is turned by an operator, the control unit 9 acts to control the operation of the motor 13 in the manner as illustrated in FIG. 3. More specifically, when steering torque increases in the righthand direction to point a in FIG. 3, the motor 13 is turned on and supplied with an offset current of a certain low level $I_{OF}$ (for example, about 2 to 10 amperes)

in order to alleviate the inertia influence from the motor 13 and the mechanical portions. As the steering torque further increases, the current supplied to the motor 13 begins to increase, at point b, linearly in direct proportion to the intensity of steering torque, and reaches 100% current at point c. On the other hand, as the steering torque decreases, current flowing through the motor 13 begins to decrease at point c and becomes to be the offset level $I_{OF}$ at point b. When the steering torque further decreases and reaches point a, the current supply to the motor 13 is reduced to zero and the motor 13 is stopped. Similar to this, the motor 13 is controlled in the same manner when the steering torque increases or decreases in the lefthand direction. In this connection, it is to be noted that the power-assisting force generated by the motor 13 is in direct proportion to the current supplied thereto.

Accordingly, as pictured in FIG. 3, as the steering torque increases, the motor 13 is energized or turned on at point a and supplied with the offset current $I_{OF}$. As the steering torque further increases, the current supplied to the motor 13 begins to gradually increase at point b so that the output torque of the motor 13 to be transmitted to the worm 14 accordingly increases gradually. As a result, the assisting force having the intensity corresponding to the operator's steering effort applied to the steering wheel 1 is transmitted from the motor 13 to the second rack tooth portion 6b on the steering rack 6 through the intermediary of the worm 14, the worm wheel 15, the electromagnetic switching clutch 16 and the second pinion 17, thereby lightening the steering operation for the operator.

Next, the case in which the vehicle is travelling will be considered. In this case, as seen from FIG. 4, the control unit 9 controls the operations of the motor 13 and the electromagnetic switching clutch 16 in the following manner. The current supplied to the motor 13 is reduced to an offset current level $I_{OF}$ (about 2–10 amperes) at point d in FIG. 4 at which the vehicle speed increases to a prescribed second reference speed $V_2$, held constant at the offset current level $I_{OF}$ until the vehicle speed further increases to a prescribed first reference speed $V_1$ at point e in FIG. 4, and reduced to zero at point e. Also, the voltage imposed on the clutch 16 is held constant at 100% level until the vehicle speed increases to the first reference speed level $V_1$ at point e, and made zero at the first reference speed level $V_1$ so that the clutch 16 is switched off to release the mechanical connection between the worm wheel 15 and the second pinion 17, thereby making the steering operation for the operator heavier without any power assist.

Figure 5:
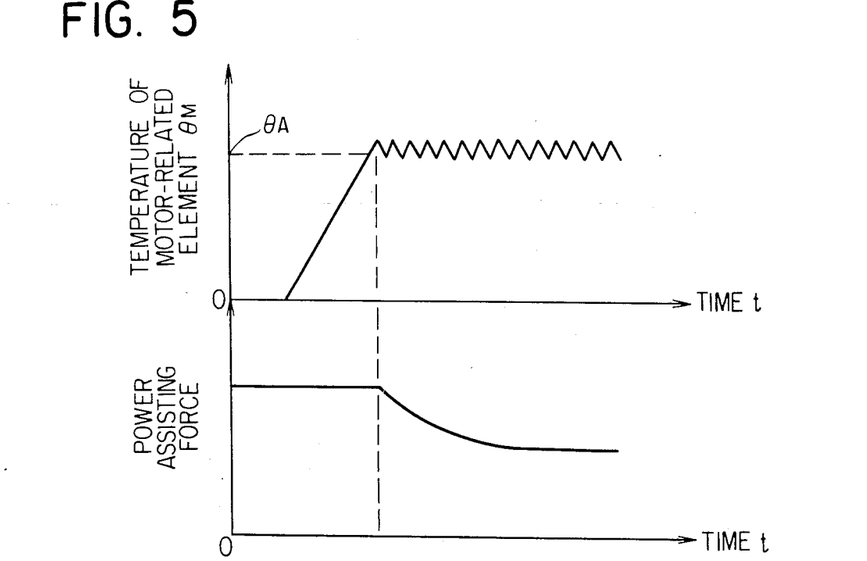
FIG. 5 shows a time-related change in the temperature of a motor-related element illustrated in FIG. 2 and a time-related change in the power assisting force in accordance with a first control process of the present invention.

On the other hand, in cases where a relatively great power assisting force is continuously required as when the vehicle is steered during standing still or travelling at very low speed, the control unit 9 controls the motor 13 and the electromagnetic switching clutch 16 in a manner as illustrated in FIG. 5. Namely, when the temperature of the motor-related element such as the motor 13, being sensed by the temperature sensor 18, rises above a prescribed level $\theta_A$ which is within a breakdown limit (for example, 100°–120° C.) of the motor-related element, the control unit 9 acts to reduce the motor current so that the temperature of the motor-related element is forced to fall to or below the prescribed level $\theta_A$ and held therewithin, thereby preventing resultant breakdown of the motor-related element. As a result, it is possible to avoid overheating of the motor 13 or sudden interruption of the current supply to the motor 13 due to the breakdown of the motor-related element. This serves to prevent abrupt change in the steering feeling as well as any uneasiness, instability or like other undesirable feelings which would be otherwise caused due to sudden loss of the power assist.

Figure 6:
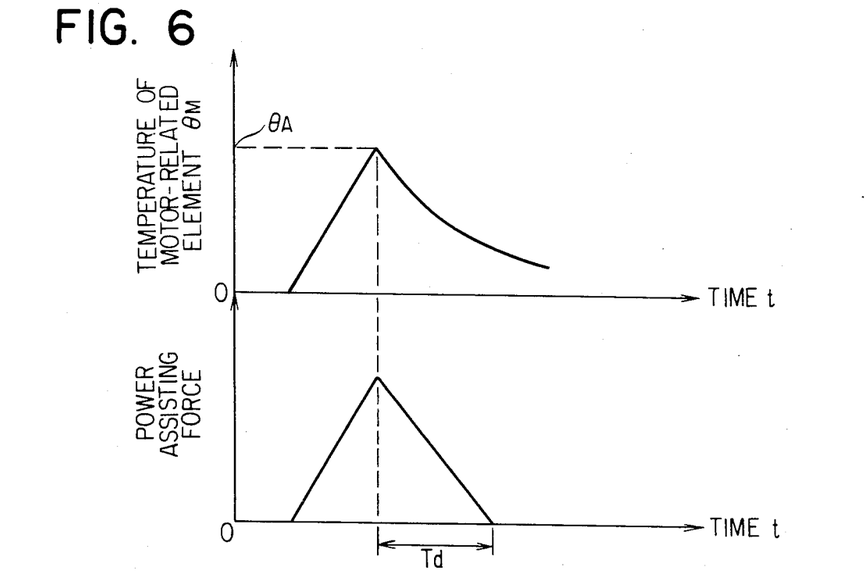
FIG. 6 shows a time-related change in the temperature of the motor-related element and a time-related change in the power assisting force in accordance with a second control process of the present invention.

In this connection, it is also possible to gradually reduce the motor current and hence the power assisting force to zero in a predetermined period of time Td (for example, 0.5–1 second) as illustrated in FIG. 6. In this case, too, the above-described effects will be obtained because the power assist is gradually decreased to zero.

Figure 7:
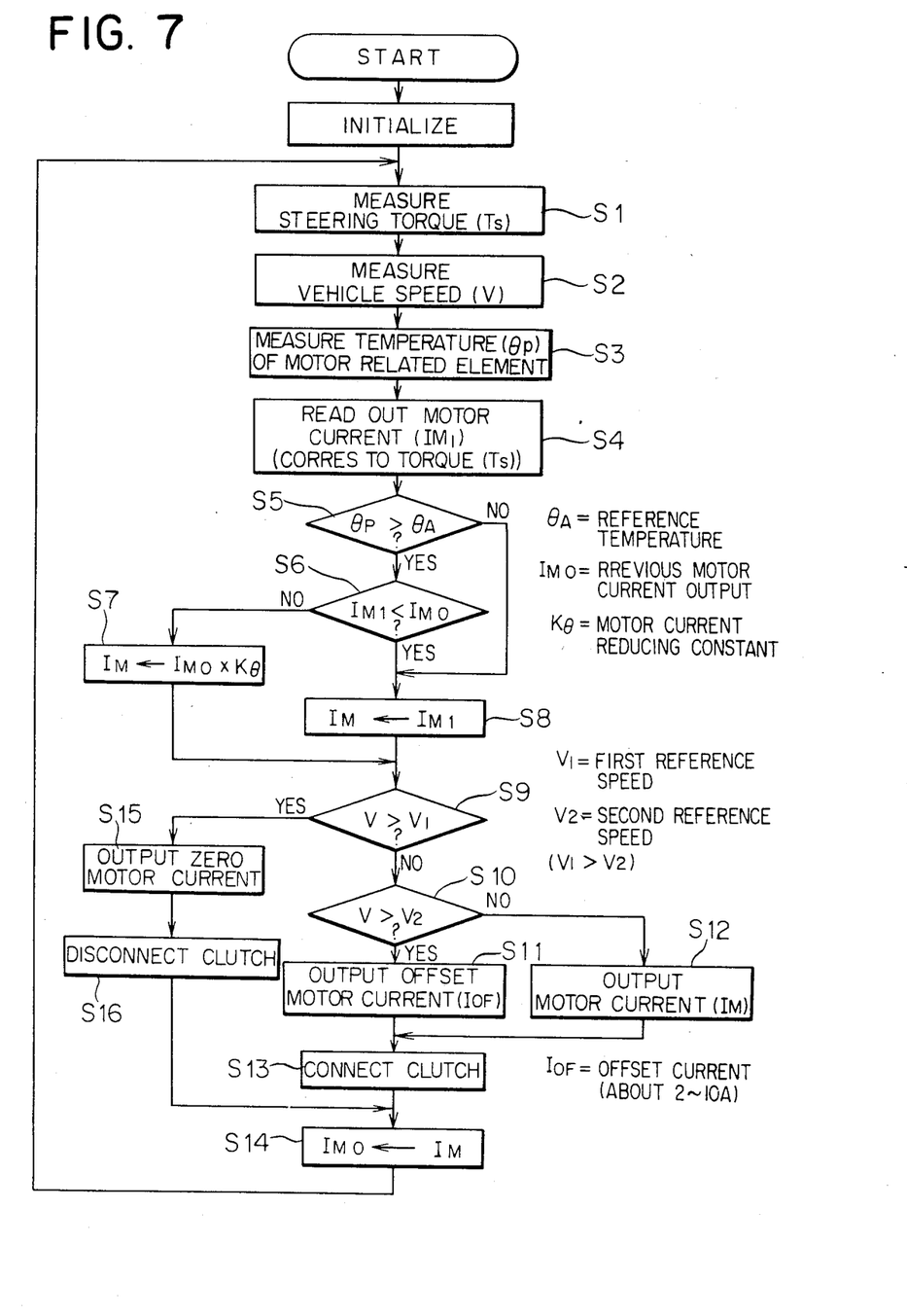
FIG. 7 is a flow chart showing the first control process as carried out by the control unit as illustrated in FIG. 2.

More specifically, the entire operation of the power steering system of this embodiment is controlled in the manner as illustrated in the flow chart of FIG. 7. In FIG. 7, the control unit 9 is initialized after the key or ignition switch 12 is turned on, and then, at step S1, from the output signal of the steering torque sensor 3, the steering torque measuring means 9a measures the steering torque $T_S$ imparted to the steering wheel 1 by the operator. At step S2, from the output signal of the vehicle-speed sensor 10, the vehicle-speed measuring means 9b measures the travelling speed V of the vehicle and generates an output signal representative of the measured vehicle speed V, and at step S3, from the output signal of the temperature sensor 18, the temperature measuring means 9c measures the temperature $\theta_p$ of the motor-related element such as the motor 13 itself and generates an output signal representative of the measured temperature $\theta_p$. At step S4, the motor current determining means 9e reads out a motor current $I_{M1}$ corresponding to the measured steering torque $T_S$ which is supplied from the power source 11 to the motor 13. At step S5, it is determined whether or not the measured temperature $\theta_p$ of the motor-related element is higher than a prescribed reference temperature $\theta_A$, and if no, the control process proceeds to step S8 whee the fresh or new motor current $I_{M1}$ as read out at step S4 is output as $I_M$ to the motor 13. If the measured temperature $\theta_p$ is higher than the reference temperature $\theta_A$, the control process proceeds to step S5 where the freshly read-out motor current $I_{M1}$ is compared with the previous motor current output $I_{MO}$ as previously read out. If the fresh motor current $I_{M1}$ is less than the previous current output $I_{MO}$, the motor current output $I_{M1}$ is supplied to the motor 13 at step S8. If $I_{M1} > I_{MO}$, then at step S7, a motor current $I_M$, which is calculated by multiplying the previous motor current output $I_{MO}$ by a motor-current reducing constant $K_\theta$ which is less than 1, is output to the motor 13. Thereafter, at step S9, it is determined whether or not the vehicle speed V is greater than a first reference speed $V_1$, and if $V > V_1$, the control process proceeds to step S15 where the motor current output is made zero, and then at step S16, the electromagnetic switching clutch 16 is switched off or disconnected. On the other hand, if $V \leq V_1$ at step S9, the control process proceeds to step S10 where it is further determined whether or not the vehicle speed V is greater than a second reference speed $V_2$ which is smaller than the first reference speed $V_1$. If $V > V_2$, the motor current is reduced to an offset current level $I_{OF}$ (for example 2–10 amperes) at step S11, and the clutch 16 is switched on or connected at step S13. At step S10, however, if $V \leq V_2$, the control process proceeds to step S12 where the motor current $I_M$ corresponding to the new steering torque $T_S$ as freshly measured at step S1 is output, and then the control process proceeds to step S13. After step S13 or S16, the motor current $I_M$ corresponding to the freshly measured steering torque $T_S$ is stored as a previous motor current output $I_{MO}$, and the control process returns to step S1. Thereafter, the same process steps are repeated.

Figures 8, 9:
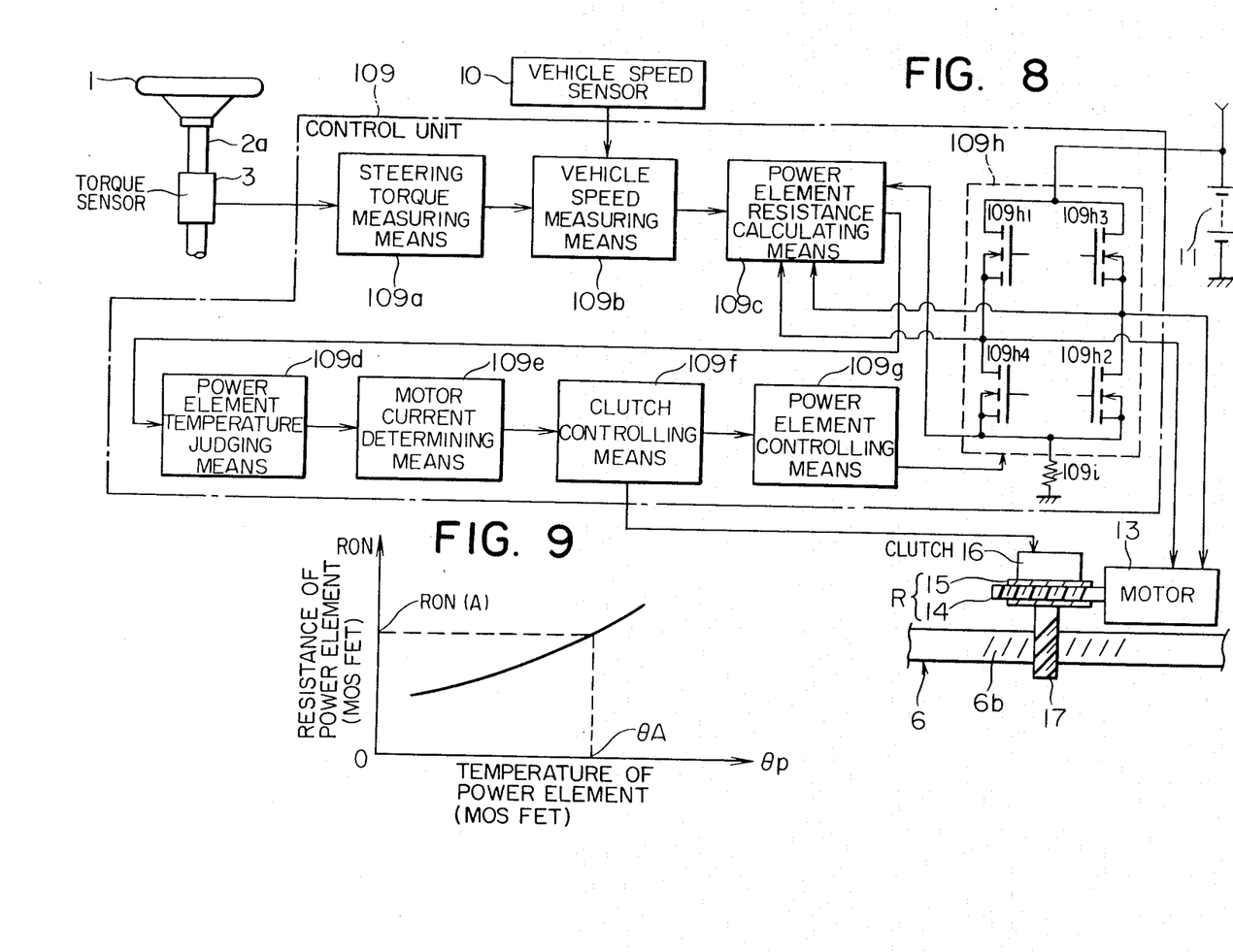
FIG. 8 is a block diagram showing a control unit and its related parts.
FIG. 9 is a characteristic view showing the relationship between the electric resistance and the temperature of a power element means in the form of a power MOS field effect transistor (abbreviated as FET) of the control unit.

FIG. 8 shows another embodiment of the present invention which is substantially similar to the previous embodiment as illustrated in FIGS. 1 through 7 except for the construction of a control unit 109. Specifically, in this embodiment, the control unit 109 includes a steering torque measuring means 109a; a vehicle speed measuring means 109b; a power element means 109h for controlling the current supplied from the power source 11 to the motor 13; a power element resistance calculating means 109c for calculating the electric resistance of the power element means 109h during operation thereof based on the voltage across the power element means 109h and the current passing therethrough, the power element resistance calculating means 109c being further operable to determine the temperature of the power element means 109h from the electric resistance thus calculated; a power element temperature judging means 109d adapted to receive the output signal from the power element resistance calculating means 109c and to determine whether or not the temperature of the power element means 109h determined by the power element resistance calculating means 109c is higher than a prescribed level; a motor current determining means 109e for determining an appropriate current supplied to the motor 13 in a manner such that the motor current is determined on the basis of the measured steering torque and the measured vehicle speed if the power element temperature judging means 109d determines that the temperature of the power element means 109h is equal to or lower than the prescribed level, and such that the motor current is decreased to lower the temperature of the power element means 109h if the power element temperature judging means 109d determines that the temperature of the power element means 109h is higher than the prescribed level; a power element controlling means 109g for controlling the running operation of the motor 13 through the power element means 109h in accordance with the current determined by the motor current determining means 109e; and a clutch controlling means 109f for controlling the operation of the clutch means 16 in accordance with the output signal from the vehicle speed measuring means 109b.

The power element means 109h comprises four power elements $109h_1$–$109h_4$ each in the form of a power MOS field-effect transistor. Of these power elements, the first and the fourth power elements $109h_1$ and $109h_4$ are connected in series with each other, and the second and the third power elements $109h_2$ and $109h_3$ are also connected in series with each other and in parallel with the first and fourth power elements $109h_1$ and $109h_4$. The connection point between the first and the third power elements $109h_1$ and $109h_3$ is electrically connected to the positive electrode of the power source 11, and the connection point between the second and the fourth power elements $109h_2$ and $109h_4$ is electrically connected through a current sensor 109i in the form of a resistor to the negative electrode of the power source 11. The current sensor 109i serves to measure the current supplied from the power source 11 to the motor 13 through the power element means 109h. The connection point between the first and the fourth power elements $109h_1$ and $109h_4$ is electrically connected to the power element resistance calculating means 109c and the motor 13, and the connection point between the second and the third power elements $109h_2$ and $109h_3$ is also electrically connected to the power element resistance calculating means 109c and the motor 13. The power element means 109h is further electrically connected to the power element controlling means 109g so that the power element means 109h is controlled by the output signal from the power element controlling means 109g.

The power element resistance calculating means 109c functions to calculate the electric resistance of the power element means 109h based on the current flowing therethrough which is sensed by the current sensor 109i, and the voltage across the power element means 109h. More particularly, the terminal voltage (i.e., the voltage between the drain and source terminals) across the second power element $109h_2$ or the fourth power element $109h_4$ when turned on or in a conductive state is measured by the power element resistance calculating means 109c, and the current flowing through the second or fourth power element $109h_2$ or $109h_4$ is measured by the current sensor 109i. From the terminal voltage and the current thus measured, the electric resistance of the power element means 109h is calculated on the basis of which the temperature of the power element means 109h is estimated using a certain relationship therebetween as illustrated in FIG. 9. In FIG. 9, the abscissa represents the temperature of each power MOS field-effect transistor and the ordinate represents the electric resistance of each power MOS field-effect transistor. Then, the power element temperature judging means 109d determines whether or not the thus determined temperature of the power element means 109h is higher than the prescribed reference temperature. Thus, in this embodiment, the temperature of the power element means 109h, which is a motor-related element, is measured instead of directly measuring the temperature of the motor 13 itself. Of other respects, the operation or the control process of this embodiment is substantially similar to the previous embodiment as illustrated in FIGS. 1 through 7, and therefore a further detailed description thereof is omitted.

Figure 10:
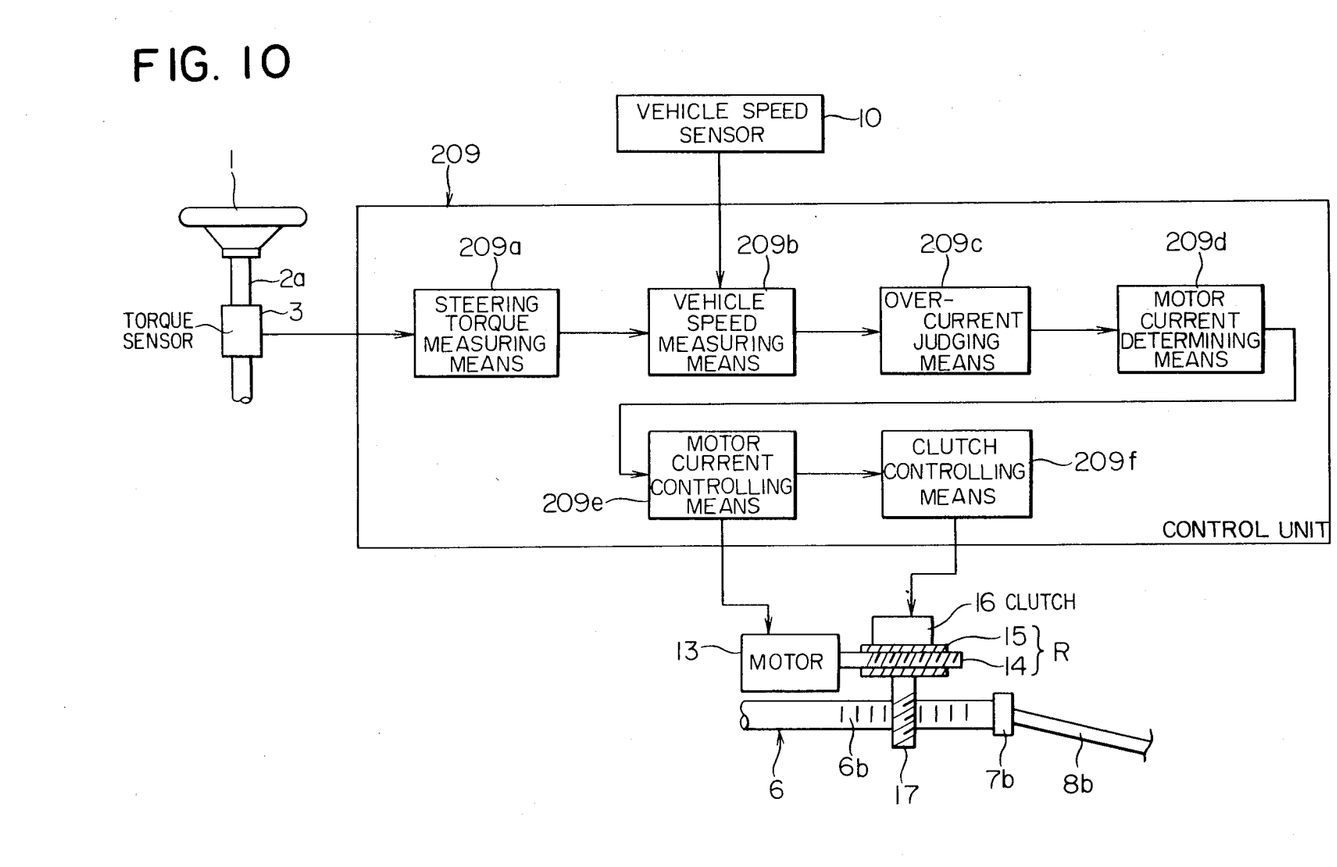
FIG. 10 is a block diagram showing a control unit and its related parts.

FIGS. 10 through 13 relates to a further embodiment of the present invention which is substantially similar to the first-mentioned embodiment except for the construction of a control unit 209. As shown in FIG. 10, the control unit 209 of this embodiment comprises: a steering torque measuring means 209a; a vehicle speed measuring means 209b; an over-current judging means 209c acting as a temperature sensor and adapted to determine whether or not current in excess of a predetermined level continuously flows through a motor-related element such as a motor 13, an unillustrated power element means or the like over a time duration longer than a prescribed period; a motor current determining means 209d for determining an appropriate current supplied to the motor 13 in such a manner that the motor current is determined on the basis of the measured steering torque and the measured vehicle speed unless the over-current judging means 209c determines that current in excess of the predetermined level continuously flows through the motor-related element over a time duration longer than the prescribed period, and that the motor current is gradually or stepwise reduced to zero or a predetermined low level to lower the temperature of the motor-related element if the over-current judging means 209c determines that current in excess of the predetermined level continuously flows through the motor-related element over a time duration longer than the prescribed period; a motor current controlling means 209e for controlling the running operation of the motor 13 in accordance with the the motor current determine by means 209d; and a clutch controlling means 209f for controlling the operation of the clutch means 16 in accordance with the output signal from the vehicle speed measuring means 209b.

Figure 11:
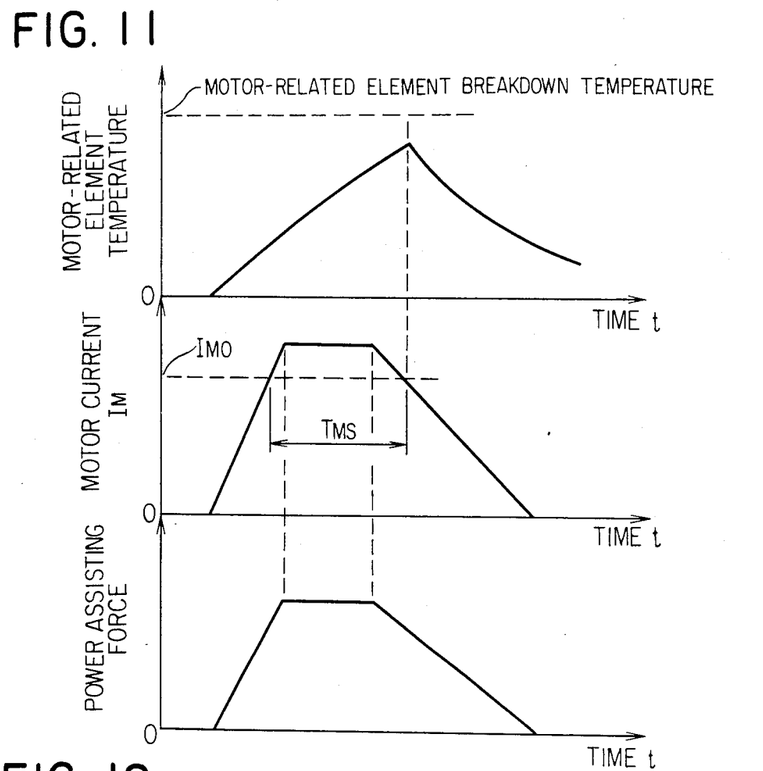
FIG. 11 shows a time-related change in the temperature of a motor-related element illustrated in FIG. 9 and a time-related change in the motor current in accordance with a third control process as carried out by the control unit of FIG. 10.
Figure 12:
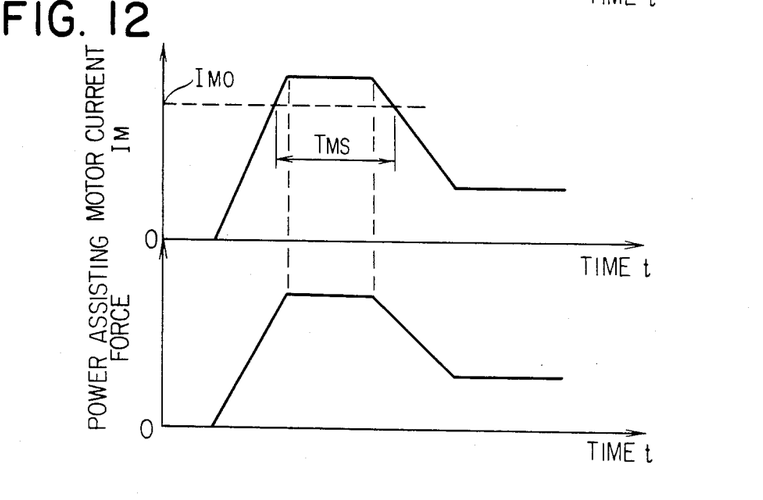
FIG. 12 shows a time-related change in the temperature of a motor-related element illustrated in FIG. 10 and a time-related change in the motor current in accordance with a fourth control process as carried out by the control unit of FIG. 10.
Figure 13:
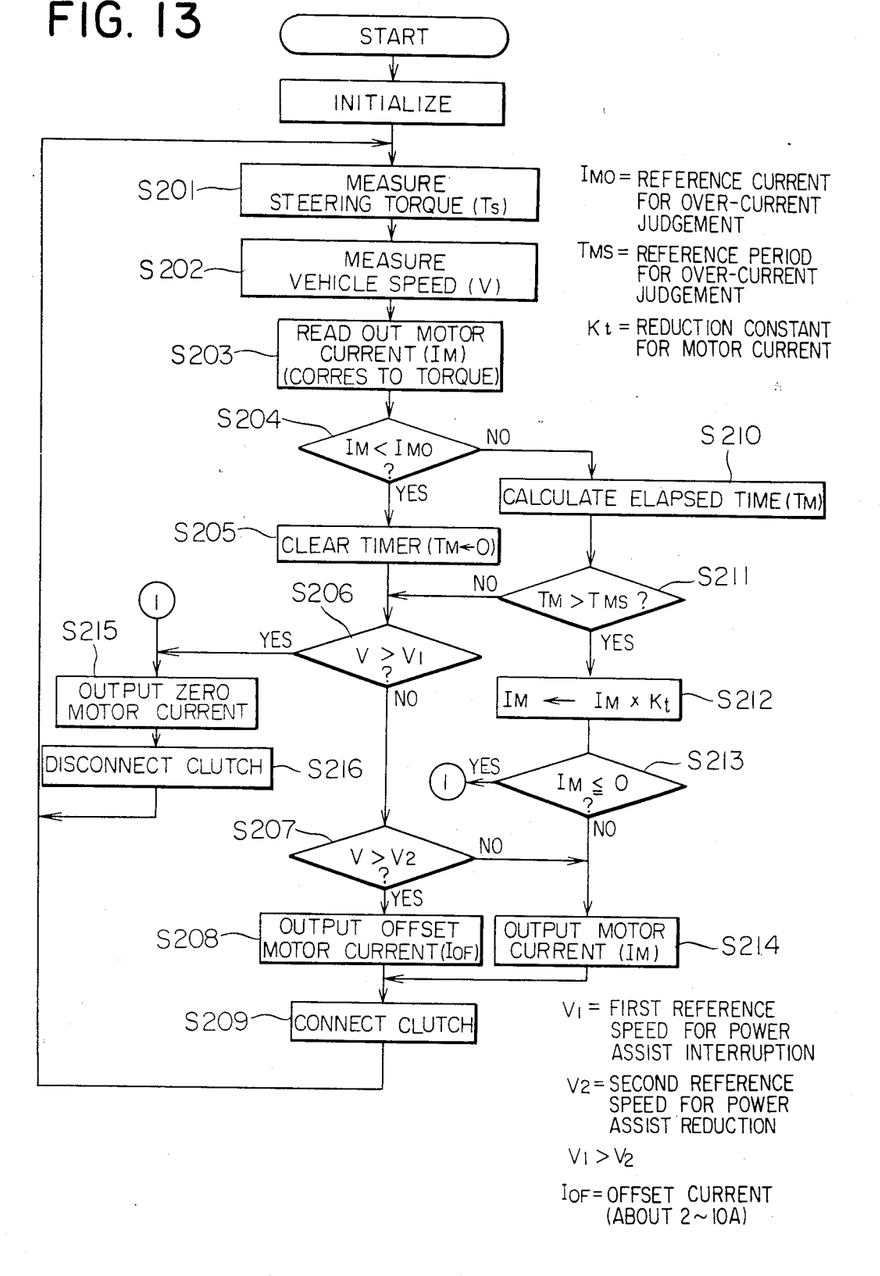
FIG. 13 is a flow chart showing the third control process as carried out by the control unit of FIG. 10.

In this embodiment, in cases where the unillustrated steerable road wheels such as front road wheels of the vehicle are to be steered to the righward or leftward limit or locking position as when steered with the vehicle standing still, the control unit 209 controls the steering system in the manner as illustrated in FIGS. 11 through 13.

Specifically, as shown in FIG. 11, when current greater than a prescribed reference value $I_{MO}$ (for example, 15-25 amperes) is continuously supplied to the motor 13 through the motor-related element for a predetermined time duration $T_{MS}$ (for example 10-60 seconds), the control unit 209 controls the motor current such that it is reduced to prevent breakdown of the motor-related element such as the motor 13, an unillustrated power element means or the like due to an excessive temperature rise or overheating thereof. In this case, the motor current is gradually reduced in a manner such that it is calculated by multiplying the motor current $I_M$, which corresponds to the operator-induced steering torque by a reduction coefficient $K_t$ which gradually decreases from 1 in accordance with the time elapsed. As a result, the motor current is gradually reduced to zero in a prescribed time (for example, 30 seconds-5 minutes). In this connection, however, as depicted in FIG. 12, the motor current may be controlled such that it is gradually reduced to a certain low level and then held constant at that level. Thereafter, the voltage imposed on the electromagnetic switching clutch 16 is made zero to release the mechanical coupling between the worm wheel 15 and the second pinion 17, thereby smoothly changing the steering system into a non-power assisted manual steering mode without causing any substantial shock as well as uneasiness or intability on the part of the operator. To this end, the control unit 209 operates to control the power steering system in the manner as illustrated in the flow chart of FIG. 13.

More specifically, the entire operation of the power steering system of this embodiment is controlled in the manner as illustrated in the flow chart of FIG. 13. In FIG. 13, the control unit 209 is initialized after the key or ignition switch 12 is turned on, and then, at step S201, from the output signal of the steering torque sensor 3, the steering torque measuring means 209a measures the steering torque $T_S$ induced by the operator. At step S202, from the output signal of the vehicle-speed sensor 10, the vehicle-speed measuring means 209b measures the travelling speed V of the vehicle and generates an output signal representative of the measured vehicle speed V, and at step S203, a motor current $I_M$ corresponding to the measured steering torque $T_S$ is read out, and then at step S204, the read-out motor current $I_M$ is compared with a reference current $I_{MO}$. If $I_M < I_{MO}$, a timer is cleared at step S205 and the control process proceeds to step S206 where the vehicle speed V measured at step S202 is compared with a first reference speed $V_1$. If $V > V_1$, the control process proceeds to step S215 where the current supplied to the motor 13 is reduced to zero, and at step S216 the electromagnetic switching clutch 16 is disconnected. If, however, $V \leq V_1$, the control process proceeds to step S207 where the vehicle speed V is further compared with a second reference speed $V_2$ which is less than the first reference speed $V_1$. If $V \leq V_2$, the control process proceeds to step S214 where the motor current $I_M$, which was read out at step S203 and which corresponds to the measured vehicle speed V is output, and at step S209 the electromagnetic switching clutch 16 is connected. If, however, $V > V_2$ at step S207, the control process proceeds to step S208 where the current supplied to the motor 13 is reduced to an offset current level $I_{OF}$, and at step S209 the electromagnetic switching clutch 16 is connected.

On the other hand, if it is determined $I_M \geq I_{MO}$ at step S204, the control process proceeds to step S210 where the time $T_M$ elapsed from the beginning of the condition $I_M \geq I_{MO}$ is calculated. Then at step S211, the elapsed time $T_M$ is compared with a reference period $T_{MS}$. If $T_M \leq T_{MS}$, the control process proceeds to step S206, but if $T_M > T_{MS}$, the control process proceeds to step S212 where the current $I_M$ to be supplied to the motor 13 is calculated by multiplying the motor current $I_M$, which was read out at step S203 and which corresponds to the measured vehicle speed V, by a reduction coefficient $K_t$ which is less than 1 and which gradually decreases as time passes. Then at step S213, it is determined whether or not the motor current $I_M$ thus calculated is equal to or less than zero. If $I_M \leq 0$, the control process proceeds to step S215, but if $I_M > 0$, the control process proceeds to step S214 where the motor current calculated at step S212 is output, and the electromagnetic switching clutch 16 is connected at step S209. After step S209 or S216, the control process returns to step S201 and the same process steps as described above will be repeated.

As will be clearly seen from the foregoing, according to the present invention, the temperature of a motor-related element such as a motor itself, a power element means or the like is measured by a temperature sensor, and if the temperature thus measured is higher than a prescribed reference temperature, the current supplied to the motor is reduced so as to lower the temperature of the motor-related element within an allowable range. As a result, it is possible to prevent damage or breakdown of the motor-related element and hence of the motor due to an abnormal temperature rise or overheating. Further, the motor current is gradually and continuously reduced as the temperature of the motor-related element rises so that there will be no abrupt change in the steering mode from power steering into manual steering or vice versa, thereby avoiding the generation of shock as well as uneasiness or instability in steering feeling on the part of the operator which would be otherwise developed upon change in steering mode with a conventional motor-driven power steering system. Thus, the power steering system of the present invention is very high in safety in operation.

What is claimed is:

1. A motor-driven power steering system for a vehicle having a steering wheel operatively connected to steer steerable road wheels in response to force exerted thereon by an operator, said motor-driven power steering system comprising:

a torque sensor connected to detect operator-induced steering torque resulting from steering force exerted on said steering wheel by the operator and generating an output signal representative of measured steering torque;

a vehicle-speed sensor to detect vehicle speed and generating an output signal representative of measured vehicle speed;

a motor operatively connected with said steerable road wheels and adapted to be energized by a power source to transmit a force to said steerable road wheels, thereby power assisting steering motion caused by the operator through said steering wheel;

a temperature sensor to detect temperature of a motor-related element and generating an output signal representative of detected temperature;

a clutch means interposed between said motor and said steerable road wheels for selectively establishing and interrupting the transmission of power assisting force from said motor to said steerable road wheels in accordance with the vehicle speed; and a control unit connected to the power source and supplying current to said motor, said control unit being connected to receive output signals from said torque sensor, said vehicle-speed sensor, and said temperature sensor, said control unit being operated by a control program to determine an increase or a decrease in current supplied to said motor to vary the power assisting force on the basis of measured vehicle speed and steering torque when the detected temperature of said motor-related element is equal to or less than a prescribed level and being operated by the control program to determine a decrease in current supplied to said motor on the basis of high detected temperature of said motor-related element only when (a) said unit control determines an increase on the basis of measured vehicle speed and steering torque and (b) said control unit determines the detected temperature of said motor-related element is higher than the prescribed level to lower the temperature of said motor-related element to within an allowable range, thereby preventing damage to said motor due to overheating thereof.

2. A motor-driven power steering system according to claim 1 wherein said control unit determines whether the detected temperature of said motor-related element is higher than the prescribed level and controls the current supplied to said motor in such a manner that the current supplied to said motor is gradually decreased to a prescribed level in a predetermined period of time.

3. A motor-driven power steering system according to claim 3 wherein said control unit determines that the temperature of said motor-related element is higher than the prescribed level when a current in excess of a prescribed level is continuously supplied to said motor over a duration longer than the predetermined period of time.

4. A motor-driven power steering system according to claim 1 wherein said motor-related element comprises said motor.

5. A motor-driven power steering system according to claim 4 wherein said control unit comprises:

a steering-torque measuring means connected to receive the output signal from said torque sensor for measuring the operator-induced steering torque;

a vehicle-speed measuring means connected to receive the output signal from said vehicle-speed sensor for measuring the vehicle speed;

a temperature measuring means connected to receive the output signal from said temperature sensor for measuring the temperature of said motor;

a temperature-judging means connected to receive an output signal representing temperature measured by said temperature measuring means to determine whether the detected temperature of the motor is higher than the prescribed level;

a motor-current determining means for determining an appropriate current to be supplied to said motor in accordance with the measured steering torque and the measured vehicle speed when said temperature-judging means determines that the detected temperature of said motor is at most equal to the prescribed level, and the current supplied to said motor is decreased to lower the temperature of said motor when said temperature judging means determines that the detected temperature of said motor is higher than the prescribed level;

a motor-current controlling means for controlling the running operation of said motor in accordance with the current determined by said motor current determining means; and a clutch-controlling means for controlling a switching operation of said clutch means in accordance with the vehicle speed measured by said vehicle-speed measuring means.

6. A motor-driven power steering system according to claim 1 wherein said motor-related element comprises a power element having an electric resistance.

7. A motor-driven power steering system according to claim 6 wherein said control unit calculates the electric resistance of said power element based on a dropping voltage thereacross the a current passing therethrough and determines the temperature of said power element from the electric resistance thus calculated.

8. A motor-driven power steering system according to claim 6 wherein said control unit comprises:

a steering-torque measuring means connected to receive the output signal from said torque sensor for measuring the operator-induced steering torque;

a vehicle-speed measuring means connected to receive the output signal from said vehicle-speed sensor for measuring the vehicle speed;

a power-element resistance calculating means for calculating the electric resistance of said power element based on a voltage dropping thereacross and a current passing therethrough and for determining the temperature of said power element from the electric resistance thus calculated;

a temperature-judging means connected to receive an output signal representing the temperature of said power element for determining whether the determined temperature of said power element is higher that the prescribed level;

a motor-current determining means for determining an appropriate current to be supplied to said motor in accordance with the measured steering torque and the measured vehicle speed when said temperature-judging means determines that the temperature of said power element is at most equal to the prescribed level, and the current supplied to said motor is decreased to lower the temperature of said power element when said temperature-judging means determines that the temperatue of said power element is higher than the prescribed level;

a motor-current controlling means for controlling the running operation of said motor in accordance with the current determined by said motor-current determining means; and a clutch-controlling means for controlling a switching operation of said clutch means in accordance with the vehicle speed measured by said vehicle-speed measuring means.

9. A motor-driven power steering system according to claim 1 wherein said control unit comprises:

a steering-torque measuring means connected to receive the output signal from said torque sensor for measuring the operator-induced steering torque;

a vehicle-speed measuring means connected to receive the output signal from said vehicle-speed sensor for measuring the vehicle speed;

an over-current judging means for determining whether a current in excess of a predetermined level is continuously supplied to said motor over a duration longer than a predetermined period of time;

a motor-current determining means for determining an appropriate current to be supplied to said motor in accordance with the measured steering torque and the measured vehicle speed unless said over-current judging means determines that the current in excess of the predetermined level continuously passes through said motor-related element over a duration longer that the predetermined period of time, and the current supplied to said motor is reduced to lower the temperature of said motor-related element when said over-current judging means determines that the current in excess of said predetermined level continuously passes through said motor-related element over a duration longer than the predetermined period of time;

a motor-current controlling means for controlling the running operation of said motor in accordance with the current determined by said motor-current determining means; and a clutch-controlling means for controlling a switching operation of said clutch means in accordance with the vehicle speed measured by said vehicle-speed measuring means.

10. A motor-driven power steering system for a vehicle having a steering wheel operatively connected to steer steerable road wheels in response to force exerted thereon by an operator, said motor-driven power steering system comprising:

a torque sensor connected to detect operator-induced steering torque resulting from steering force exerted on said steering wheel by the operator and generating an output signal representative of measured steering torque;

a vehicle-speed sensor to detect vehicle speed and generating an output signal representative of measured vehicle speed;

a motor operatively connected with said steerable road wheels and adapted to be energized by a power source to transmit a force to said steerable road wheels, thereby power assisting steering motion caused by the operator through said steering wheel;

a temperature sensor to detect temperature of a motor-related element and generating an output signal representative of detected temperature;

a clutch means interposed between said motor and said steerable road wheels for selectively establishing and interrupting the transmission of power assisting force from said motor to said steerable road wheels in accordance with the vehicle speed; and a control unit connected to the power source and supplying current to said motor, said control unit being connected to receive output signals from said torque sensor, said vehicle-speed sensor, and said temperature sensor, said control unit being operated by a control program to determine an increase or a decrease in current supplied to said motor to vary the power assisting force on the basis of measured vehicle speed and steering torque when the detected temperature of said motor-related element is equal to or less than a prescribed level and being operated by the control program to determine a decrease in current supplied to said motor on the basis of high detected temperature of said motor-related element only when (a) said unit control determines an increase on the basis of measured vehicle speed and steering torque and (b) said control unit determines that the temperature of said motor-related element is higher than the prescribed level on the basis of a current in excess of a prescribed level being continuously supplied to said motor over a duration longer than a predetermined period of time to lower the temperature of said motor-related element to within an allowable range, thereby preventing damage to said motor due to overheating thereof.

* * * * *